July 11, 1961  G. C. GAUT  2,991,540
ELECTRICAL CAPACITORS
Filed April 3, 1956  3 Sheets-Sheet 1

INVENTOR
GEOFFREY CHARLES GAUT

July 11, 1961 G. C. GAUT 2,991,540
ELECTRICAL CAPACITORS

Filed April 3, 1956 3 Sheets-Sheet 3

INVENTOR
GEOFFREY CHARLES GAUT

William E. F. Bayly
BY
ATTORNEY

United States Patent Office 2,991,540
Patented July 11, 1961

2,991,540
ELECTRICAL CAPACITORS
Geoffrey Charles Gaut, Caswell, Green Norton, England, assignor to The Plessey Company Limited, Ilford, England, a British company
Filed Apr. 3, 1956, Ser. No. 575,912
Claims priority, application Great Britain Apr. 5, 1955
1 Claim. (Cl. 29—25.31)

This invention relates to electrical capacitors of the electrolytic type. An electrolytic capacitor, for the purposes of this specification, is one in which one of the electrodes has upon it a thin film, usually produced by electrolytic action, which forms the dielectric; the other electrode of the capacitor is effectively an electrolyte in contact with the film. A counter electrode is used in contact with the electrolyte. In use, the one electrode is made positive with respect to the counter electrode, and so it is convenient to identify these two parts as anode and cathode respectively, in accordance with the usual practice.

In the wet electrolytic capacitor the electrolyte is in a fluid form; in the so-called "dry" capacitor the electrolyte is a pasty, viscous condition and in use in the capacitor is substantially non-fluid. This invention is concerned with "dry" electrolytic capacitors.

In the dry electrolytic capacitor the conductance of the pasty or viscous electrolyte is such as to require the anode to cathode spacing to be small, in order that the power factor of the capacitor can be kept reasonably low.

In the past, dry electrolytic capacitors have been manufactured by using two foils of aluminium, forming one of them in an electrolyte to produce the desired dielectric coated anode, winding the formed anode and the other, cathode, foil with paper interleaving into a roll, impregnating the roll with the final electrolyte, and sealing it in a suitable container. The process involves a number of concomitant operations such as washing, drying, and so on.

In general such a process has certain major disadvantages when carried out on a commercial scale. The apparatus occupies a large space; considerable electrical power is required to carry out the forming operation, a large proportion of this power being dissipated in the evaporation of large quantities of water from the forming solution, which must accordingly be replaced by chemically pure water.

In accordance with a feature of the present invention, in the manufacture of a dry electrolytic capacitor the anode and cathode are folded, and not rolled, before introduction into the final container or its equivalent.

This feature of the invention, as will be more particularly pointed out hereinafter, leads to certain other features of the invention, thereby made possible.

Thus, in accordance with a further feature of the invention, in the manufacture of dry electrolytic capacitors, the electrodes are first folded and are then formed. Again, in accordance with a further feature of the invention capacitors are formed in the electrolyte which is the eventual electrolyte to be used.

Other features and advantages of the specification will appear from the following description of an embodiment thereof, which will be given by way of example, in conjunction with the accompanying drawings, in which—

Figure 1:
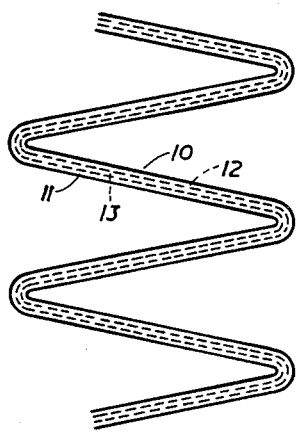
FIGURE 1 is a diagrammatic cross-section of a section of capacitor electrodes.
Figure 2:
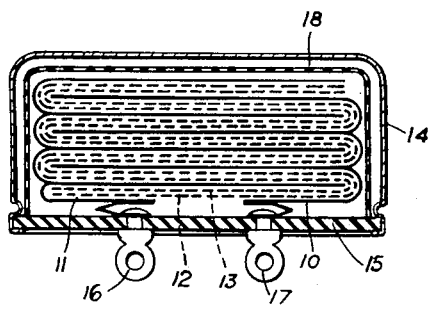
FIGURE 2 is a cross-section through a capacitor in accordance with the invention.

FIGURE 1 show, in section, a capacitor electrode assembly in accordance with the invention, in the course of manufacture. The assembly includes an anode strip 10, a cathode strip 11 and two interposed, separating and electrolyte-absorbing strips 12 and 13. Anode strip can be a plain foil of dielectric film forming material, aluminium being at present the most suitable material, but alternatively and preferably the anode strip is one in which the effective area of the film forming material is much greater than the apparent area of the strip. Thus a metal foil can be used the surface of which has been roughened by chemical or other means. It is also desirable that the anode strip should be permeable to the electrolyte used, and in this embodiment we therefore use a chemically fine cotton gauze material upon both sides of which has been deposited by means of a metallising gun a finely reticulated porous mass of aluminium particles.

The cathode strip 11 can be chosen from materials suitable for the anode strip, but in this embodiment a strip of plain aluminium foil is used.

The separating strips 12 and 13 are paper tissues; they have a width slightly greater than the anode and cathode strips, which are of the same width.

The foils thus assembled are folded in the fashion indicated in FIGURE 1, by alternate folds in opposite directions. The dielectric film is formed upon the anode strip, by immersing the anode and cathode strips in a suitable electrolyte and applying a positive potential to the anode. When the dielectric film has been formed, the folds of the electrode assembly are closed and the assembly, impregnated with a suitable electrolyte is suitably encased, for example in an aluminium can 14 open at one end, having an insulating disc closure 15. The anode and cathode can be riveted or otherwise directly secured to terminals 16, 17 in the disc; this has the advantage, over the normal practice, of dispensing with the terminals strips which must be fastened to the two electrodes. The can 14 may be rectangular, which has a better surface to volume ratio than the more usual cylindrical can, although the latter can be used if desired. In inserting the folded assembly in the can an insulating strip 18 is used between the exposed edges of the anode and the can.

The advantage of the construction of invention described is that it lends itself to more highly mechanised production than does a conventional wound capacitor.

In making a capacitor by winding the electrode assembly, it is necessary first to prepare the anode strip, to form it and dry it. Any processing of the cathode strip must also be carried out. The winding is then started by securing the ends of the electrode strips and separating strip to a mandrel, and the capacitor is wound. The end of the winding is secured, and the wound unit is impregnated and encased. It will be seen that the process of manufacture consists of a number of discrete steps.

On the other hand, the present invention can be carried out to a far larger extent as a continuous process, and there will now be described a machine by which a substantial part of the manufacture is executed.

In this machine the electrode and spacing strips are assembled in a simple guide frame 20 so that the anode is uppermost, the two papers together in the middle and the cathode underneath, all horizontally. The assembly is fed forwardly to a folding mechanism 21 where it is folded, concertina fashion, the successive folds being spaced apart by a distance about equal to the width of the assembly. At this stage the folds are not made tightly, so that the adjacent surfaces of the anode, and those of the cathode, are separated. The assembly as it emerges from the folding mechanism enters a sloping guideway 22, down which it is slowly pushed along, being gradually compressed as it does so.

As it moves in this way the assembly is drenched with electrolyte, the type which is suitable for use in the capacitor when in use. At the same time, a potential is impressed between the cathode and anode with the object of forming the dielectric film on the anode.

As the assembly progresses along the channel 22 and the dielectric film is formed, the folds are gradually compressed by means of a stop mechanism 23.

When the anode strip has been completely formed the strip is cut at 24 into lengths appropriate to desired values of capacitance.

Figure 3:
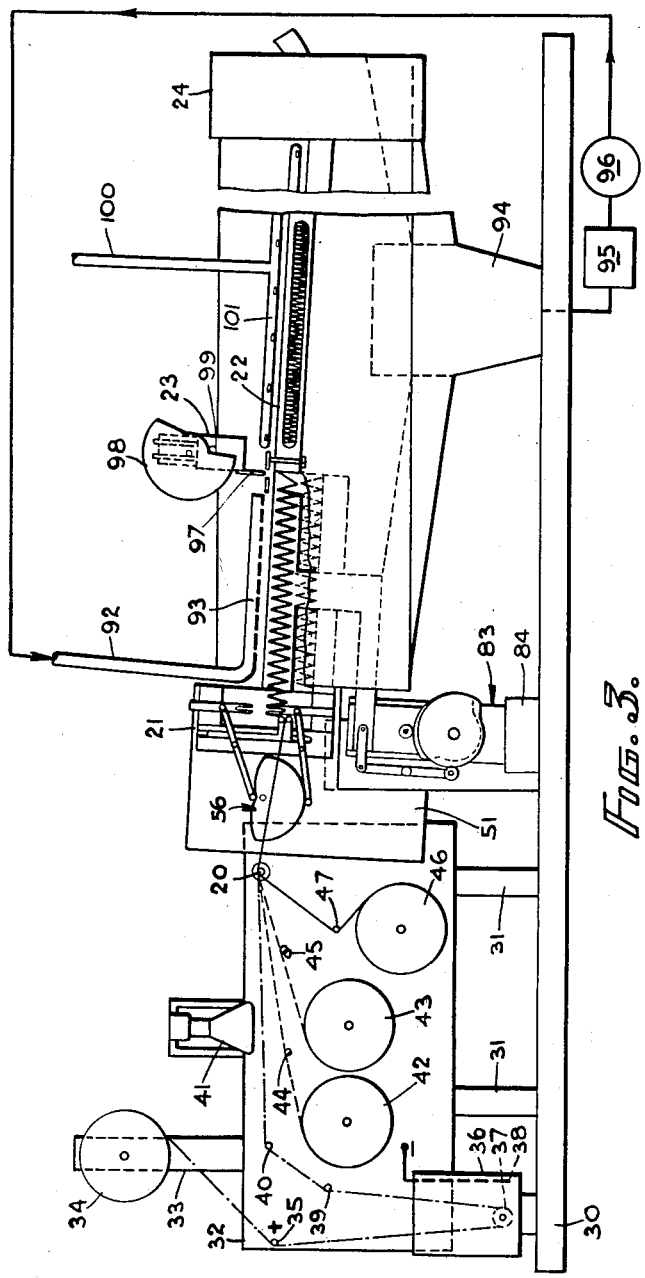
FIGURE 3 is a partly diagrammatic elevational view of a machine in accordance with the invention for folding and forming electrodes in the manner indicated in FIGURE 1.

Describing now the apparatus of FIGURE 3 in rather more detail, the apparatus is built upon a base 30; from this base there is supported, by stanchions 31, a vertical support panel 32. On a support 33 extending from the upper part of panel 32 is a reel 34 of anode strip material. In this embodiment there is used for the anode strip a two ply gauze material, sprayed with aluminium, to provide the finely porous film forming electrode described above.

The anode strip from reel 34 passes over a guide 35 and thence into a preforming tank 36. Tank 36 contains an electrolyte, such an aqueous solution of boric acid, which is suitable for the initial forming on the electrode strip of the necessary dielectric film. The strip is held in the tank by passing over a guide or weighted roller 37. The film is formed by connecting the anode strip to a point of positive potential, for example by making the guide 35 electrically conducting and connecting it to a terminal of a suitable supply, and by inserting an electrode 38 in the tank 36 and connecting this to the negative terminal of the same supply. By this means the dielectric film on the anode strip is first partly formed.

As the anode strip leaves the tank 37, it passes over further guides 39, 40, and is roughly dried by being passed beneath an infra-red heater 41. The substantially dry strip then passes to the guide 20.

Also mounted on panel 32 are two reels 42, 43 of paper tissue strip, which together form the separating strip for the electrode assembly. The tissues are unwound from the reels and pass over guides 44, 45 respectively, and thence to the guide 20. In a similar manner, a reel 46 of cathode strip, in this case a plain strip of aluminium, is mounted on panel 32, and the cathode strip passes over guide 47 and thence to guide 20. In this way there will emerge from the guide 20 an aligned assembly of four strips, anode uppermost and cathode lowermost.

Figure 4:
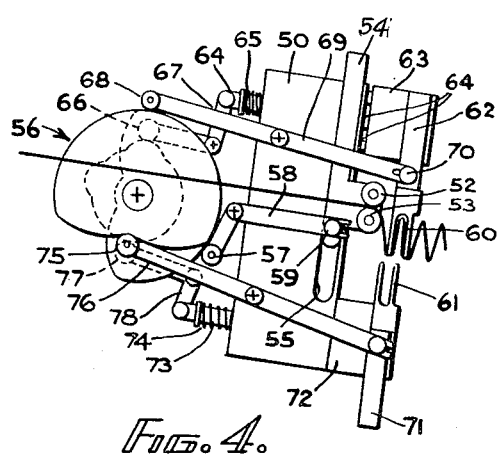
FIGURE 4 is a view of part of the machine of FIGURE 3 showing more clearly the means for folding the electrodes and FIGURE 5 is a view of part of the machine of FIGURE 3, showing more clearly the means for driving the driving combs.

This assembly of strips passes to the folding mechanism which is indicated generally at 21 in FIGURE 3, and which is shown, partly diagrammatically, in more detail in FIGURE 4. This mechanism comprises a main support block 50, carried on a panel 51 supported from base 30. Mounted so as to be guided for linear movement in the support block 50 is a pair of rollers 52, 53, between the nip of which the strip assembly passes. The rollers 52, 53 are carried upon a slide 54 which moves in a guideway 55 in block 50. The slide 54 is moved by means of one cam surface of a multiple cam assembly 56, with a cam follower 57 mounted on the end of a cranked lever 58; the end of lever 58 is forked to engage a driving pin 59 on slide 54. In this way the slide 54, and with it the rollers 52, 53, is caused to reciprocate linearly.

Also mounted on support block 50 are two bifurcated forming guides 60 and 61. The two guides are arranged to move each in a rectangular motion, the motions overlapping, so to form the strip assembly in a concertina or zig zag fashion. With this object guide 60 is mounted upon a slide 62, which moves in a guideway in a block 63, so as to be capable of movement in the direction which is roughly vertical in FIGURE 4. Block 63 is carried by support block 50, so as to be movable with respect thereto in the direction from left to right in FIGURE 4; the block 63 is carried on guide bars 64 which pass through the block 50. One of the guide bars 64 projects from the left hand end of support block 50, and is biased by means of a spring 65 in the left hand direction. Slide 62 and bars 64 are both actuated by means of the multiple cam assembly 56. The projecting bar 64 is actuated by means of a cam follower 66, mounted on a pivoted cranked lever 67, and slide 62 is actuated by a cam follower 68 on pivoted lever 69, the end of which engages a driving pin 70 on slide 62.

The forming guide 61 is mounted on the support block 50 in a similar manner. Guide 61 is carried on slide 71, itself moving on a block 72. Block 72 can move from left to right, by being carried on bars of which one is shown at 73, and is biased by means of spring 74. Slide 71 is reciprocated in the vertical direction of FIGURE 4 by means of a cam follower 75 carried on the pivoted lever 76, and the bar 73 is actuated by a cam follower 77 on the pivoted cranked lever 78. In this way the forming guide 61 will likewise perform a rectangular motion.

The movements of the rollers 52, 53, the forming guide 60 and the forming guide 61 are so phased as to give the desired folding of the strip assembly. Briefly, starting from the positions of the parts shown in FIGURE 4, slide 71 will move upwardly until the bifurcations of the two guides 60 and 61 are fully intermeshed, those of guide 61 being to the left hand side of those of guide 60. In this position the rollers 52, 53 are approximately at the uppermost limit of their movement. Whilst the bifurcations of guides 60 and 61 remain intermeshed, the rollers 52 and 53 move downwardly to the lowermost limit of their motion, thereby folding the strip assembly downwardly over the left hand face of the guide 61. When the rollers 52 and 53 are at the bottom limit of their travel, forming guide 60 is moved upwardly until the bifurcations on it are fully clear of those on guide 61; during this movement the strip assembly will remain in contact with the guide 61 because it is held down by means of the rollers 52, 53, which at this time are imposing light downward tension on the strip assembly. Guide 60, when fully disengaged, moves to the left and then in a downward position, so as to pass over the strip on the left hand face of the lower guide 61. When this last movement is completed, the rollers 52, 53 again move upwardly, and then the guide 61 moves downwardly to disengage from the guide 60 in a similar manner, except that it is in the reverse direction. The lower guide 61 then moves to the left, and the cycle of operation is repeated.

The strip assembly, folded in this way, as it emerges from the folding mechanism 21 enters the long, slightly sloping guideway 22. The first part of this guideway is not formed with a complete lower floor; the guideway is formed with two side walls which give the necessary lateral guiding for the strip assembly, and midway between these side walls there is one vertical strip which provides support for the lower face of the folded strips. In the two spaces thus formed between the side walls and the intermediate strip are two combs 80, 81, shown in more detail in FIGURE 5. The purpose of these two combs is to hold open the folds of the folded strip at this stage of the manufacture, and also give a positive drive to advance the strip away from the folding mechanism and towards a stop mechanism 23 by which the strip is eventually impressed.

The combs 80 and 81 both move in a rectangular motion. The desired motion of the two combs is effected by means of a multiple cam assembly indicated generally at 83 in FIGURE 3 and shown in more detail in FIGURE 5. The cam assembly is supported from base 30 by means of a suitable support 84. In the upper part of the support 84 is a slide 85 which is reciprocated in an approximately vertical direction by means of one of the cams of the assembly 83, by means of a cam follower 86.

Mounted in slide 85 is a cross slide 86A, which is able to reciprocate in a direction approximately at right angles to the movement of slide 85. One, 80, of the combs is supported from cross slide 86A by means of an integral arm 87, and the reciprocating movement of the cross slide, and with it arm 87 is effected by means of another of the cams of assembly 83 by means of cam follower 88, a pivoted lever 89, and a coupling link 90.

Figure 5:
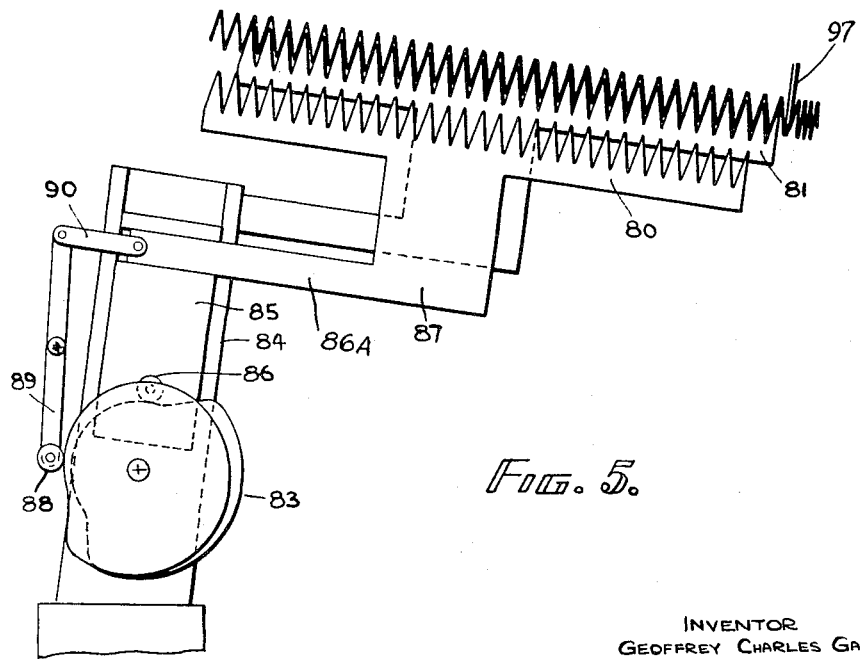

The two cams of the assembly 83 engaged by followers 86 and 88 are so shaped and phased that comb 80 performs a movement in which it is moved upwardly relatively quickly, then moves slowly to the right as seen in FIGURES 3 and 5, is then withdrawn downwardly relatively quickly and moves from right to left back to its starting position.

The comb 81 is moved by a similar arrangement of parts, differing only from the arrangement of those parts used to drive comb 80 in that the relative timing of movement of the two combs is such that only one of them is at any one time in its uppermost position and moving from left to right. The vertical movement of the combs is sufficient, and is so disposed, that each comb will in turn engage the folded assembly as it leaves the folding means at 21, and moves it to the right as seen in FIGURE 3. The movement of the combs is synchronised with the folding, so that the combs advance one tooth for each complete fold of the strip assembly. In this way, the combs progress the folded strip away from the folding mechanism, and at the same time hold open, in a uniform spacing, the folds of the assembly.

Whilst the strip assembly is being moved by the comb mechanism described, it is drenched with electrolyte and, by the application of a suitable potential between the anode and cathode strips, a further forming of the dielectric film takes place while the folded strip material is in the channel 22. The electrolyte is fed in through a supply pipe 92 the end 93 of which lies above and parallel to the folded strip assembly. This part 93 of the pipe is perforated as indicated diagrammatically in FIGURE 3, and from these perforations the electrolyte is fed in copious quantities onto the electrode assembly. A sufficient quantity of the electrolyte is used to ensure that the entire surface of the electrode assembly is coated with electrolyte. The surplus electrolyte drains from the assembly to a funnel shaped collector 94, from which it passes to a reservoir and cooling tank 95. From the tank 95 the electrolyte is pumped by pump 96 to the inlet to pipe 92. The potential necessary to form the dielectric film on the anode strip is imposed between anode and cathode by making suitable electrical connections to the guides over which the strips pass. For example potentials can be applied to guides 39 and 40 and to 47. If desired, the same source of supply can be used for forming the film as is used for the preforming. In this case it is necessary to join electrode 38 to guide 47, if necessary through an appropiate control circuit.

As mentioned above, the power required to form the dielectric film on the anode is considerable, and much of the energy is dissipated as heat, largely by evaporation of the water content of the aqueous electrolyte which is normally used. With the arrangement described, however, it is possible to pass a continuous flow of cool electrolyte over the anode whilst it is being formed; the relatively high temperature difference between the strip assembly and the electrolyte gives efficient heat transfer to the electrolyte, without causing excessive heating of the latter.

This is most important, because the nature of the electrolyte changes if its temperature is raised excessively; it becomes more viscous, and its composition alters, and in general deteriorates as an electrolyte.

The electrolyte used with the process of the present invention has a much lower water content than the forming solution normally employed, and so the heat loss in evaporation and the loss of the water itself is substantially reduced. Moreover, it is possible to use the heat content of the electrolyte collected in the collector 94 for secondary heating purposes. In this case the tank 95 shown in FIGURE 3 can be taken to represent a secondary heating system.

The forming of the anode with the final electrolyte is possible only because the assembly of strips at the forming stage is sufficiently open to permit an adequate flow of coolant electrolyte, over so much an area of the assembly, especially the anode strip, that any local overheating of the assembly, and with it any trapped electrolyte, is avoided.

In passing, it may be noted that in practice a rolled capacitor assembly cannot be successfully formed after it has been wound. The thermal conductivity of the rolled assembly is poor; the heat produced within the assembly will damage the components and the gas evolved may separate the windings or cause even more positive damage.

The heat produced by the formation of the dielectric film on the anode is a maximum at the beginning of the forming operation and decreases as the forming process continues. Thus the use of the preforming tank 36 has the advantage of reducing the heat dissipated at the initial stages of the second forming which takes place after the electrode strip has been folded, and it also has the advantage of separating the two heat dissipating sections of the apparatus.

The fact that the heat dissipation from the electrode assembly decreases as the forming proceeds means that the folds of the assembly can be safely closed up towards the end of the forming process. As mentioned above, the folded strip is compressed by means of a stop mechanism 23 which imposes a stop blade into the path of the strip as it moves along the channel 22. Blade 97 is operated by means of a cam 98, with a cam follower 99 driving the blade 97. The movement of blade 97 is synchronised with the movements due to cam assembly 83 and cam assembly 56.

The strip assembly as it leaves the stop mechanism 23 is more closely folded, but the forming of the dielectric film is continued as the strip continues to move along channel 22. Accordingly, a further pipe 100 is fed with electrolyte from pump 96, pipe 100 having a lower extension 101 extending over the length of the folded strip in the lower section of the channel 22, and having in the extension a series of perforations from which the electrolyte will be discharged over the folded strip. The surplus electrolyte passes to collector 94 as before. The continuation of the forming process in this way after the folds of the electrode assembly have been closed up, also has the advantage that should any minute cracks be formed in the electrode strips or the film upon them in this folding process any such cracks will "heal" and reform during this latter forming process.

At the end of the channel 22 electrode assembly is cut into lengths appropriate to the individual capacitances required in the finished capacitors, and this is effected by the cutting mechanism 24. Since the electrode assembly is continuous there is still voltage applied between the anode and cathode strips and so to avoid the danger of short-circuting the forming voltage supply during the cutting operation the voltage is removed for a very short time while the cutting is taking place.

Made as described above, the folds of the assembly will be of uniform size but it is possible to arrange that periodically a one larger fold is made. This large fold will project from the general body of the assembly can be used to mark and end of a section, to facilitate the intermediate cutting of a section or to assist in making a connection to an electrode.

There is a requirement for multiple unit capacitors, with a plurality of anodes and one or more cathodes. Such capacitors can be provided in various ways; by the use of a further anode strip and a further pair of papers, disposed on the exposed side, that is, the underside of the assembly as described above, and folded up with it, by the use of separate anodes, disposed along the length of a common cathode, or by separate units in a common can.

In an alternative arrangement for effecting the concertina folding of the strip assembly, the folding guides described are replaced by a series of plates; plates of the two series are caused to engage the assembly alternately, to fold it by a pivoting action of the plate and when the fold is complete the plate is withdrawn. Each series of plates can be carried upon a shaft which both rotates about its own longitudinal axis and moves parallel to that axis.

The manufacture of capacitors by a method such as that described above has substantial advantages in practice. The simplification of the process, due to the elimination of many of the customary steps, has already been touched upon, but there is an important advantage that large scale production of capacitors can be effected with apparatus which takes up a comparatively small space. There is only one treatment apparatus, in which a number of capacitor assemblies, side by side, can be simultaneously handled. The folded form of the assemblies permits an apparatus which is neither very deep nor very long to be used.

Another important advantage of the process described is that the edges of the electrodes do not have to be cut after they have been formed, so that edge effects due to this cause are avoided. Again the folding of the electrodes, as compared with a wound electrode, has the advantage of better heat dissipation and this is of importance where in service the capacitor has to carry a high ripple current or is used on alternating current.

There is one advantage of the process which is not readily apparent. The anode material, as mentioned above, can consist of a base of process woven material, which may be gauze, sprayed with aluminium. It would be an advantage to use paper for the base, as being much less expensive than the gauze, but in the conventional process the anode must be pulled through the various treatment baths when it is, of course, in a wet condition. Suitable capacitor tissue is so weak mechanically when wet that it cannot be used in this way, but in the process described the folded assembly is pushed and not pulled through the treatment apparatus when wet and so is much more able to withstand the handling it receives.

A capacitor made by the present invention has a slight increase in power factor due to the fact that the anode does not have a cathode surface immediately adjacent both sides, as in the conventional rolled capacitor, but provided the anode is permeable the effect is not substantial.

The effect can be avoided by more complicated methods of folding the assembly.

I claim:

Apparatus for the manufacture of electrode assemblies for dry electrolytic capacitors, comprising a strip material folding means, means for feeding a combined strip assembly including a first strip adapted to form an anode, a second strip adapted to form a counter electrode and a strip like separating medium between said first and second strips to the folding means which latter is arranged to form transverse parallel folds in the combined strip assembly thereby to produce a folded strip assembly; cam means for controlling the operation of the folding means; means for synchronising the movement of the feeding means and the folding means so that the feeding means delivers the correct length of the strip assembly for each folding operation of the folding means, a guideway located adjacent to the folding means for supporting the folded strip assembly produced by the folding means, transfer means operating in the guideway and synchronised with folding means actuation for moving the folded strip assembly along the guideway, the transfer means including comb-like elements which hold the folds of the folded strip assembly in a part open relationship whilst moving them along the guideway, drenching means positioned above the guideway, in the vicinity of the transfer means, for drenching the part open folds of the strip assembly with a continuous flow of electrolyte; means for producing a dielectric film forming voltage across the part folded material within the guideway by applying voltage across the guide in the vicinity of the drenching means, simultaneously with the application of the continuous electrolyte flow thereby further to form the anode strip; means operating within the guideway for compressing the folds of the assembly, further drenching means located above the guideway in the vicinity of the compression means for drenching the folds of the strip assembly with electrolyte as they are compressed by the compressing means; and means for applying a further voltage across the guideway in the vicinity of the compressing means so as to produce a further forming voltage across the folded strip whilst in the guideway during the further drenching of the folds.

References Cited in the file of this patent

UNITED STATES PATENTS

| | | |
|---|---|---|
| 1,498,206 | Salfisberg | June 17, 1924 |
| 1,789,451 | Rosaire | Jan. 20, 1931 |
| 2,151,806 | Schnoll et al. | Mar. 28, 1939 |
| 2,216,186 | Deeley | Oct. 1, 1940 |
| 2,216,655 | Smith et al. | Oct. 1, 1940 |
| 2,290,163 | Brennan | July 21, 1942 |
| 2,497,330 | Smith | Feb. 14, 1950 |
| 2,506,021 | Holmberg | May 2, 1950 |

FOREIGN PATENTS

| | | |
|---|---|---|
| 269,378 | Great Britain | Apr. 21, 1927 |
| 394,485 | Great Britain | June 29, 1933 |
| 270,972 | Switzerland | Jan. 3, 1951 |
| 903,040 | France | Sept. 21, 1945 |